(No Model.) 2 Sheets—Sheet 1.

E. THOMSON.
MODE OF COOLING ELECTRIC MOTORS.

No. 518,291. Patented Apr. 17, 1894.

Witnesses.
A. F. Macdonald.
A. L. Clone

Inventor.
Elihu Thomson.
by Burley & Blodgett
Attys.

(No Model.) 2 Sheets—Sheet 2.

E. THOMSON.
MODE OF COOLING ELECTRIC MOTORS.

No. 518,291. Patented Apr. 17, 1894.

Witnesses.
A. F. Macdonald.
A. C. Orne.

Inventor.
Elihu Thomson
by Bentley & Blodgett
Attys.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

MODE OF COOLING ELECTRIC MOTORS.

SPECIFICATION forming part of Letters Patent No. 518,291, dated April 17, 1894.

Application filed November 30, 1892. Serial No. 453,659. (No model.)

*To all whom it may concern:*

Be it known that I, ELIHU THOMSON, a citizen of the United States, residing at Swampscott, county of Essex, State of Massachusetts, have invented certain new and useful Improvements in Modes of Cooling Electric Motors, of which the following is a specification.

My invention relates to electric motors, and its object is to rapidly conduct away the heat generated by a motor, especially when it is so located as not to be readily accessible, as for instance in mines or wells.

The invention consists in providing the motor casing with means for rapidly abstracting therefrom the heat generated by the motor. This may be done by increasing the outer surface of the casing, in order to permit a more rapid radiation of heat, such increase being obtained by means of ribs, grooves, studs or projections; or, the casing may be surrounded by a jacket, and a cooling fluid circulated through the intervening space; or, the casing may be connected at opposite points, with a pipe forming a closed circuit through which the heated air flows automatically, a portion of the pipe being exposed to cooling agencies, such as a water jacket surrounding it. The inside of the motor-casing may also be provided with studs, projections or the like to enable it the more readily to absorb the heat.

Figure 1:
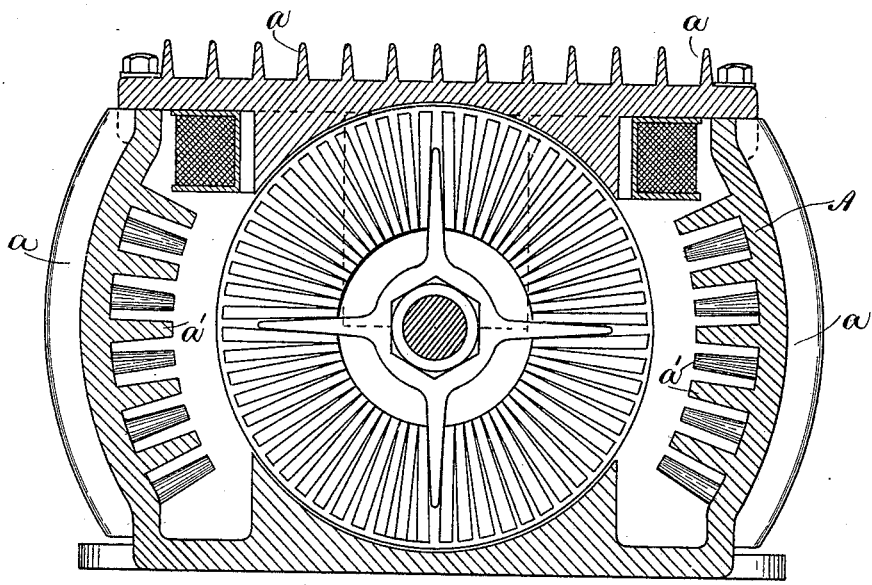
Figure 2:
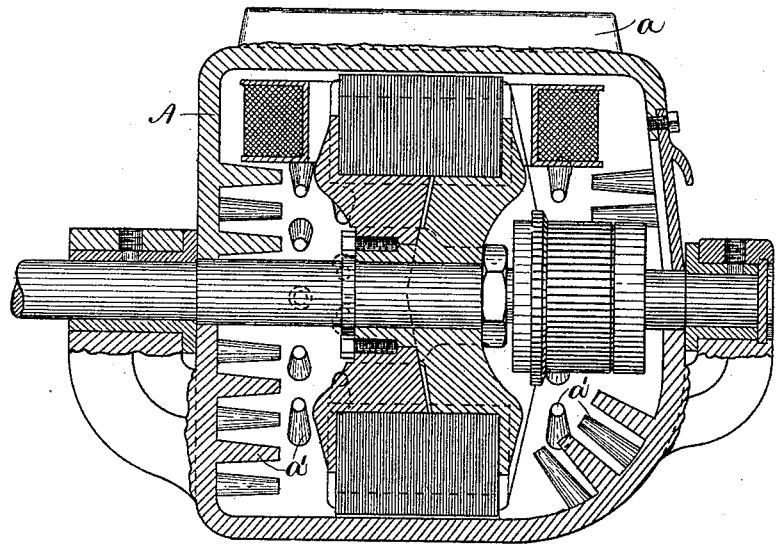
Figure 3:
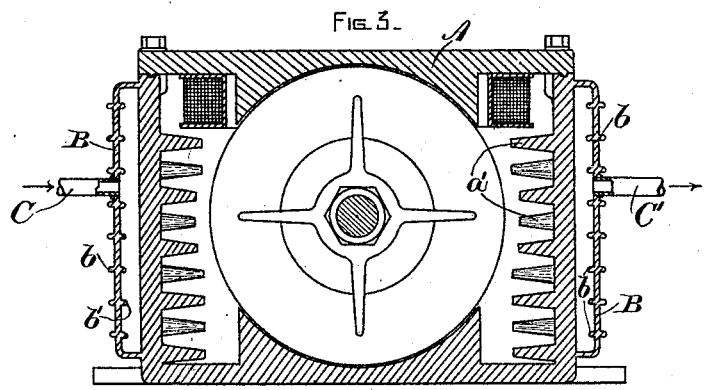
Figure 4:
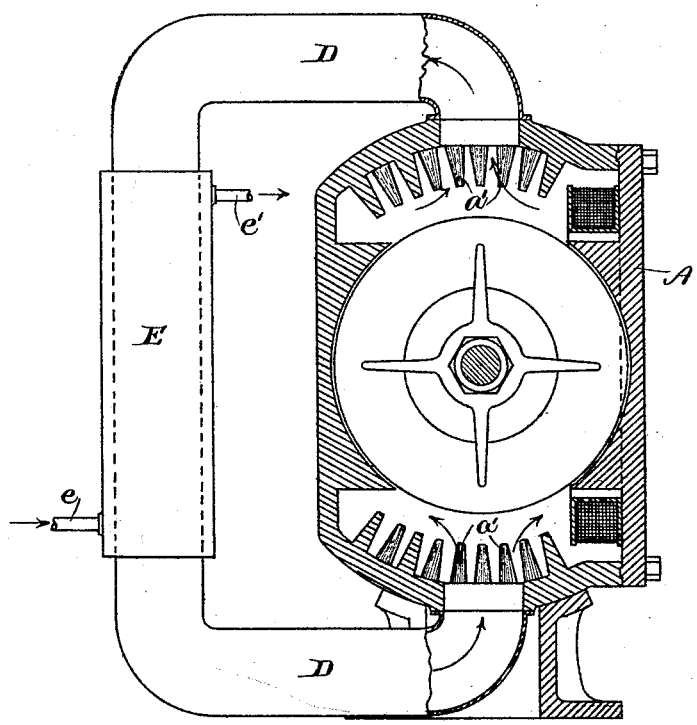
Figure 5:
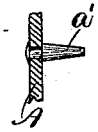

In the drawings, Figure 1 is a vertical cross section of an electric motor embodying my invention. Fig. 2 is a section at right angles to Fig. 1. Figs. 3 and 4 illustrate modifications, and Fig. 5 is a detail.

The type of motor is immaterial. The one illustrated has its field closed through the walls of the casing A, which may be conveniently, though not necessarily, made in two parts bolted together, as shown. The casing is preferably water-tight to protect the motor from moisture, since it is liable to be drenched with or even submerged in water when used in mining operations. Externally the casing is provided with ribs $a$, or grooves, or projections of any shape suitable for increasing the outer surface, in order to effect a more rapid radiation of the heat generated by the motor and absorbed by the casing. To facilitate this absorption, studs or projections $a'$ of any suitable shape may be formed on or attached to the inside of the casing, those in Figs. 1, 2, 3, and 4 being shown as cast integral with the casing, while Fig. 5 shows a separate piece riveted or otherwise secured in a hole in the casing.

Fig. 3 illustrates a casing with a jacket B in place of or in addition to the external ribs $a$. Pipes C, C' convey a cooling fluid to and away from the jacket. To assist in the radiating effect the jacket itself may have ribs $b$, $b'$ on the outside and inside, or either of them.

In Fig. 4 is shown a motor having its casing connected on opposite sides, preferably the top and bottom, with the ends of a pipe D passing around outside of the casing and forming a closed circuit through the casing. The heated air rises and escapes at the top, and flowing into the pipe D parts with the heat and descends to re-enter the casing at the bottom. The cooling may be effected by giving the pipe D a large radiating surface, or preferably by surrounding a portion of it with a jacket E through which water or any other cooling medium is conveyed by pipes $e$, $e'$.

What I claim as new, and desire to secure by Letters Patent, is—

The combination of an electric motor, a closed casing therefor provided with projecting studs or lugs adapted to increase its radiating surface, a pipe communicating with such casing, and a water jacket surrounding a portion of the pipe, all arranged, substantially as set out herein, to provide a waterproof inclosing casing for an electric motor, adapted to dissipate the heat generated therein.

In witness whereof I have hereto set my hand this 23d day of November, 1892.

ELIHU THOMSON.

Witnesses:
JOHN W. GIBBONEY,
BENJAMIN B. HULL.